(12) United States Patent
Nishide et al.

(10) Patent No.: US 6,935,692 B2
(45) Date of Patent: Aug. 30, 2005

(54) SEAT POSITION DETECTION UNIT (75) Inventors: Harutomi Nishide, Saitama (JP); Kazutomo Isonaga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/646,186

(22) Filed: Aug. 22, 2003

(65) Prior Publication Data

US 2004/0046433 A1 Mar. 11, 2004

(30) Foreign Application Priority Data

Aug. 30, 2002 (JP) ........................................ 2002-255184

(51) Int. Cl.[7] .......................... A47C 1/023; F16M 13/00
(52) U.S. Cl. .................. 297/344.11; 248/429; 248/430; 340/686.1
(58) Field of Search ..................... 297/344.11; 248/429, 248/430; 340/686.1, 686.6, 689

(56) References Cited

U.S. PATENT DOCUMENTS

| | | | | | |
|---|---|---|---|---|---|
| 5,873,629 | A | * | 2/1999 | Schuler | .................. 248/430 X |
| 6,053,529 | A | | 4/2000 | Frusti et al. | |
| 6,851,655 | B2 | * | 2/2005 | Kume et al. | ................. 248/429 |
| 2002/0125396 | A1 | * | 9/2002 | Kume et al. | ................. 248/429 |

FOREIGN PATENT DOCUMENTS

| | | | | | |
|---|---|---|---|---|---|
| JP | 59023740 | A | * | 2/1984 | .................. 248/429 |
| JP | 62020737 | A | * | 1/1987 | .................. 248/429 |
| JP | 62234744 | A | * | 10/1987 | .................. 248/429 |
| JP | 01240331 | A | * | 9/1989 | .................. 248/429 |
| JP | 03243432 | A | * | 10/1991 | .................. 248/429 |

* cited by examiner

Primary Examiner—Rodney B. White
(74) Attorney, Agent, or Firm—Carrier, Blackman & Associates, P.C.; Joseph P. Carrier; William D. Blackman

(57) ABSTRACT

A seat position detection unit which has a movable member, a stationary member, an attaching member, a position sensor, and a detecting object.

In this seat position detection unit, the movable member is attached to a bottom of a seat and is put together with the stationary member so that the movable member is allowed to slide along the stationary member. The position sensor and the detecting object to be detected by the position sensor are provided to the stationary member and the movable member, separately. Here, the stationary member is attached to a floor through the attaching member.

One of the position sensor and the detecting object that is attached to the stationary member and the mounting member are provided as a single piece.

16 Claims, 5 Drawing Sheets

SEAT POSITION DETECTION UNIT

BACKGROUND OF THE INVENTION

1. Field of the Invention

The present invention relates to a seat for a vehicle, preferably to a vehicle seat which slides with respect to a floor of the vehicle, and which is equipped with a seat position detector. More specifically, the present invention relates to a seat position detection unit, which measures the position of the seat.

2. Description of Relevant Art

As an example of a seat position detection unit, the seat position detection unit disclosed in U.S. Pat. No. 6,053,529 can be cited.

The seat position detection unit disclosed in U.S. Pat. No. 6,053,529 has a stationary rail, which is fixed to a floor of a vehicle, and a movable rail, which is attached to a seat of the vehicle and is put together with the stationary rail so that the movable rail (seat) is allowed to slide along the stationary rail.

In this seat position detection unit, a magnetometric sensor is provided on the stationary rail, and a detecting object that can be detected by the magnetometric sensor is provided on the movable rail.

In this seat position detection unit, the magnetometric sensor detects that the seat is positioning at the previously established position by detecting the detecting object, which is moved toward the magnetometric sensor when the seat is slid with respect to the floor. In other words, the magnetometric sensor detects whether the seat is positioning at the prescribed position by detecting the detecting object using the magnetometric sensor when the seat is slid with respect to a floor of the vehicle.

In this seat position detection unit, a more improved positional accuracy between the magnetometric sensor and the floor of the vehicle is required in order to detect whether the seat is positioning at the prescribed position with accuracy. To be more precise, the detecting object has to be provided on the stationary rail with superior positional and locational accuracy.

That is, not only the positioning of the stationary rail to the floor but also the arrangement of the magnetometric sensor to the stationary rail had to be performed with accuracy. Therefore, the assembling of the seat position detection unit requires more working hours in order to perform theses operations with accuracy. Thus, the workability of the assembling has been made complicated.

In this seat position detection unit, additionally, a bracket for fixing the stationary rail to the floor and a support member for mounting the magnetometric sensor to the stationary rail are separately provided. Thus, in this seat position detection unit, the accurate positioning of the bracket and the support member had to be performed with fastidious care. Thereby, the workability of the assembling of the seat position detection unit has further been complicated.

Therefore, the seat position detection unit, which can easily be assembled, and which can accurately measure whether the seat is positioning at the prescribed position, has been required.

SUMMARY OF THE INVENTION

The present invention relates to a seat position detection unit equipped with a slide mechanism that allows a seat to slide with respect to a floor. This seat position detection unit includes a position sensor, a detecting object, and a mounting member.

The position sensor is attached to one of a stationary member and a movable member that constitute the slide mechanism. The detecting object, which is detected by the position sensor, is disposed at the other of the stationary member and the movable member. The mounting member mounts the stationary member to the floor. In this seat position detection unit, one of the position sensor and the detecting object that is attached to the stationary member is united with the mounting member.

In the seat position detection unit adopting a slide mechanism, when the seat is slid with respect to a floor, since the movable member is fixed to the seat, the movable member (the seat) is slid along the stationary member. In this occasion, if the detecting object is disposed at the stationary member and the position sensor is disposed at the movable member, the position sensor is approached to the position where the detecting object is placed. Thus, if the position sensor reaches at the position of the detecting object, the presence of the detecting object is detected by the seat position detection unit.

In the present invention, additionally, the seat position detection unit can detect the presence of the detecting object even if the detecting object is disposed at the movable member and the position sensor is disposed at the stationary member.

In this seat position detection unit, one of the position sensor and the detecting object that is attached to the stationary member is united with the mounting member. Thus, the accuracy of the location between the position sensor and the stationary member or between the detecting object and the stationary member is achieved, if the stationary member is fixed to the floor through the mounting member after performing the accurate positioning between the floor and the stationary member 14.

Thereby, when assembling the seat position detection unit, the positioning step, in which the accurate positioning of the position sensor or the detecting object is performed, can be omitted. Thus, the workability of the assembling of the seat position detection unit will be improved. Additionally, the seat position detecting object can measure whether the seat is positioned at the prescribed position.

In the present invention, still furthermore, the mounting member and one of the position sensor and the detecting object are formed into a single piece, and this lessens the numbers of the parts that constitutes the seat position detection unit. Thus, the workability of the assembling of the seat position detection unit will further be improved.

DETAILED DESCRIPTION OF THE PREFERRED EMBODIMENT

The preferred embodiment of the present invention will be explained with reference to the attached drawings.

Figure 1:
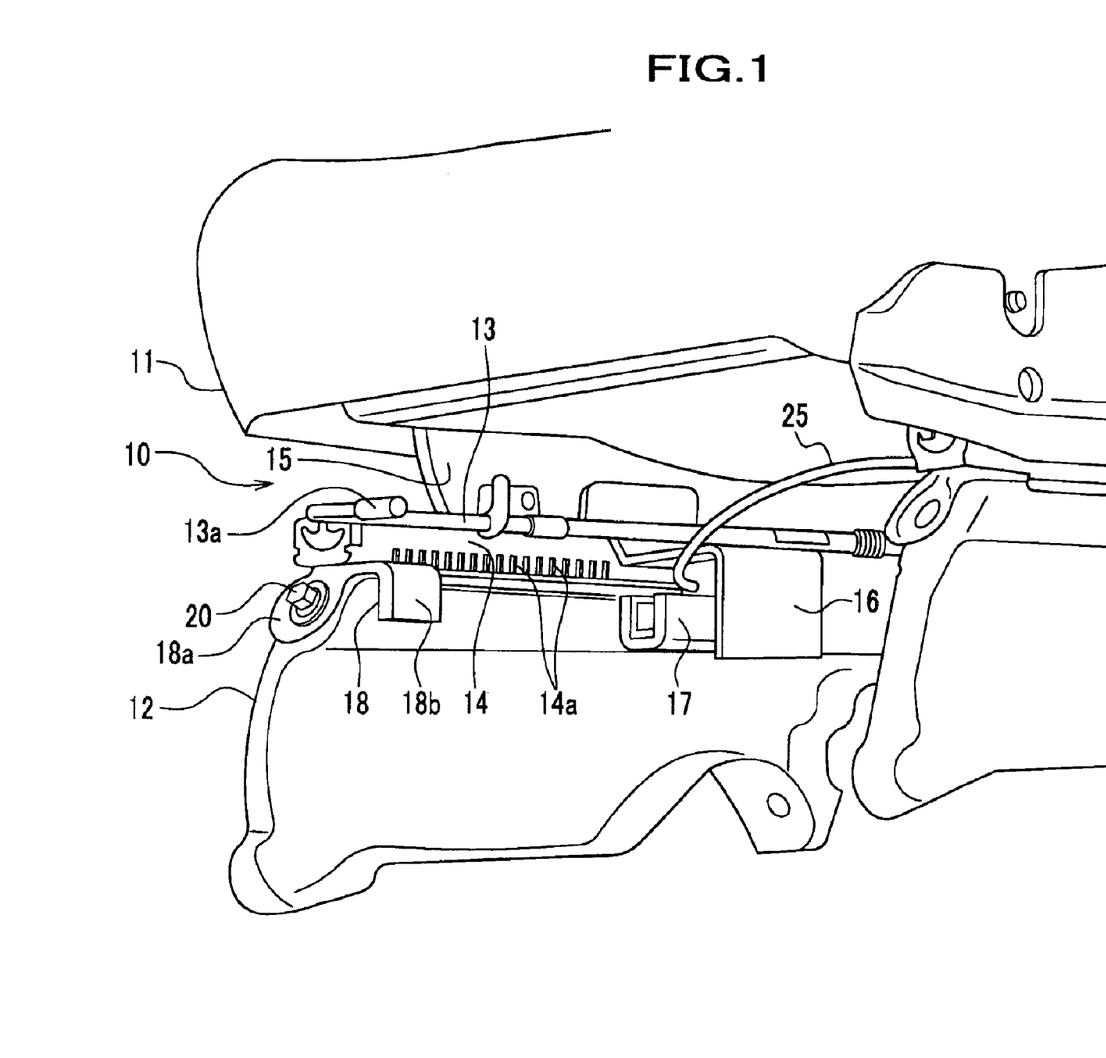
FIG. 1 is a perspective view which looked at a vehicle seat equipped with the seat position detection unit from the bottom direction.

As shown in FIG. 1, a seat position detection unit 10, which is mounted on a floor (not shown) of a vehicle through a base member 12, is disposed at the bottom of a seat 11.

Here, intervening members between the floor and the seat position detection unit, such as the base member 12, shall be contained in a term of "floor".

A movable member 15, described in further detail below, is one of components of the seat position detection unit 10, and is connected to the seat 11 at top part thereof. The bottom part of the movable member 15 is put together with the stationary member 14 so that the movable member 15 is allowed to slide along the stationary member 14. Thereby, the seat 11 which is connected to the movable member 15 is allowed to slide along the stationary member 14.

A seat position adjustment device 13, which adjusts the position in the fore-and-rear directions of the seat 11, is provided at the inner surface of the movable member 15.

In this seat position adjustment device 13, when a user operates a lever 13a and releases the safety lock, the seat 11 is allowed to slide in the fore-and-rear directions along the stationary member 14. In this occasion, since the stationary member 14 has notches 14a, which are provided along a longitudinal direction thereof at regular intervals, the positioning of the seat 11 is performed in compliance with these notches 14a.

Figure 2:
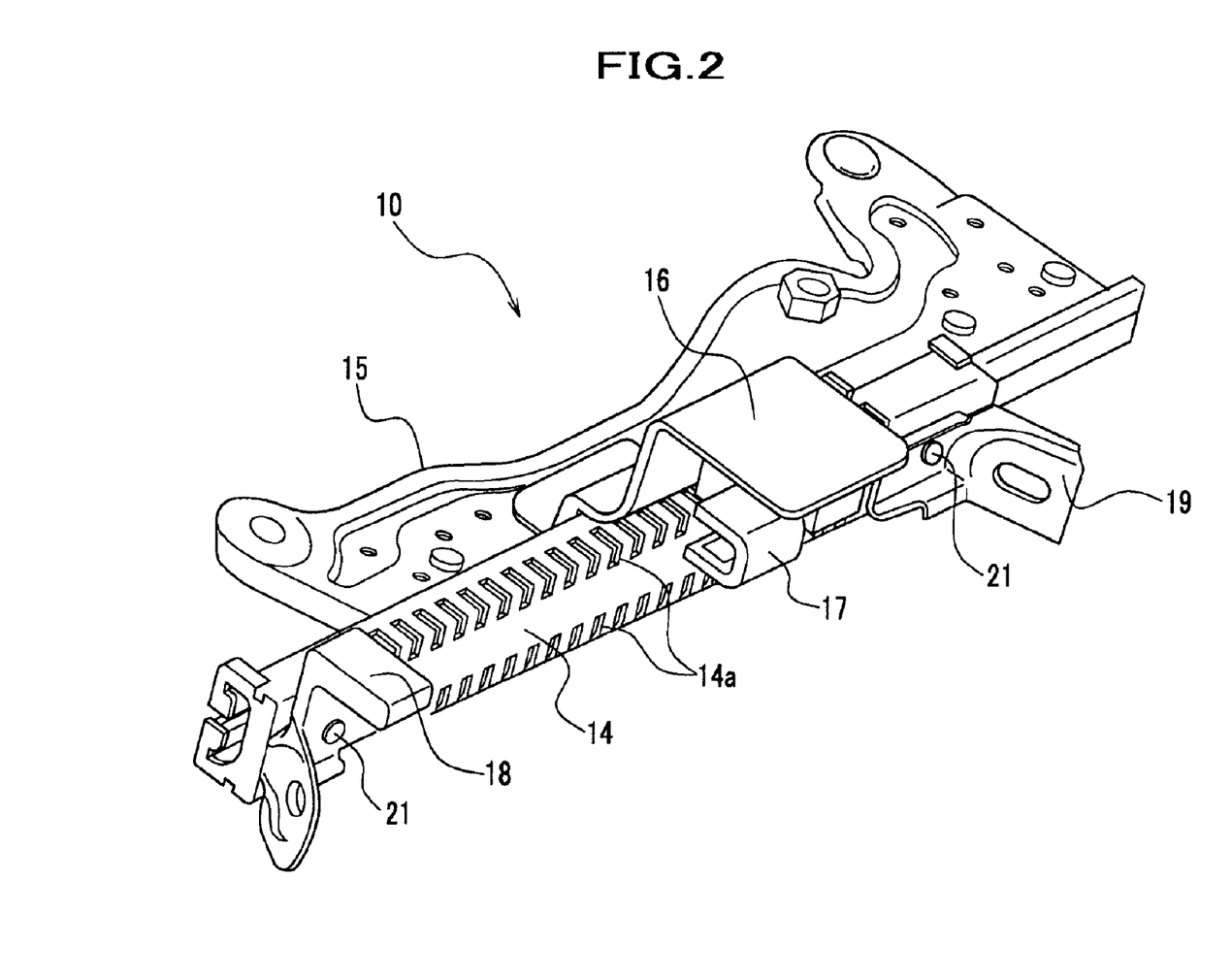
FIG. 2 is a perspective view showing the construction of the seat position detection unit.

As shown in FIG. 2, the seat position detection unit 10 has a stationary member 14, a movable member 15, a sensor mounting bracket 16, a position sensor 17, a conjugated bracket 18, and a stationary bracket 19.

Figure 3:
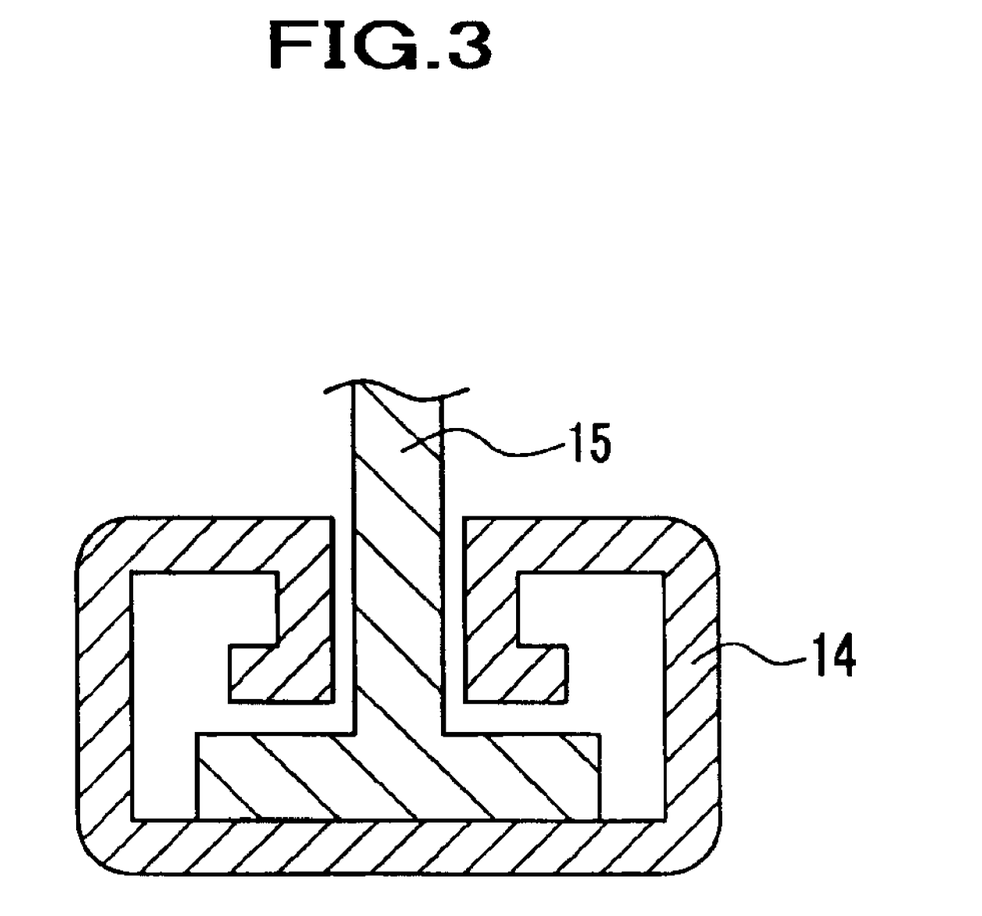
FIG. 3 is a sectional view which schematically shows the stationary member and the movable member which are assembled together.

As shown in FIG. 2 and FIG. 3, the stationary member 14 is of C-like shaped cross-section and is provided ranging from the fore-side of the seat 11 to the rear-side of the seat 11. The conjugated bracket 18, described in detail below, is fixed at one end (fore-side end) of the stationary member 14 through a rivet 21. The stationary bracket 19 is fixed at the other end (rear-side end) of the stationary member 14.

As can be seen from FIG. 1, the stationary member 14 is provided on the base member 12 in the condition that both longitudinal ends of the stationary member 14 are located along the fore-and-rear directions of the seat 11. A fore-side end of the stationary member 14 is attached to the base member 12 through the conjugated bracket 18, which is fixed to the base member 12 by a bolt 20. A rear-side end of the stationary member 14 is attached to the base member 12 through the stationary bracket 19, which is fixed to the base member 12 by a bolt (not shown).

In the present embodiment, a pair of base members 12 and 12 is provided under the seat 11. Here, one of the base members 12 and 12 is located at the left side of the seat 11, the other of the base members 12 and 12 is located at the right side of the seat 11. In the present invention, therefore, the stationary members 14 are placed on the respective base members 12 so that the stationary members 14 and 14 are parallel with each other.

As shown in FIG. 2, the movable member 15 is a plate-like shaped long member. One side in the width directions of the movable member 15 is formed into a T-like shape in the cross sectional viewing (FIG. 3).

The movable member 15 is put together with the stationary member 14 at the T-shaped part thereof so that the movable member 15 slides along the stationary member 14. The movable member 15, which is put together with the stationary member 14 and is located upright with respect to the stationary member 14, is connected to the seat 11 at the other side ends thereof.

Figure 4:
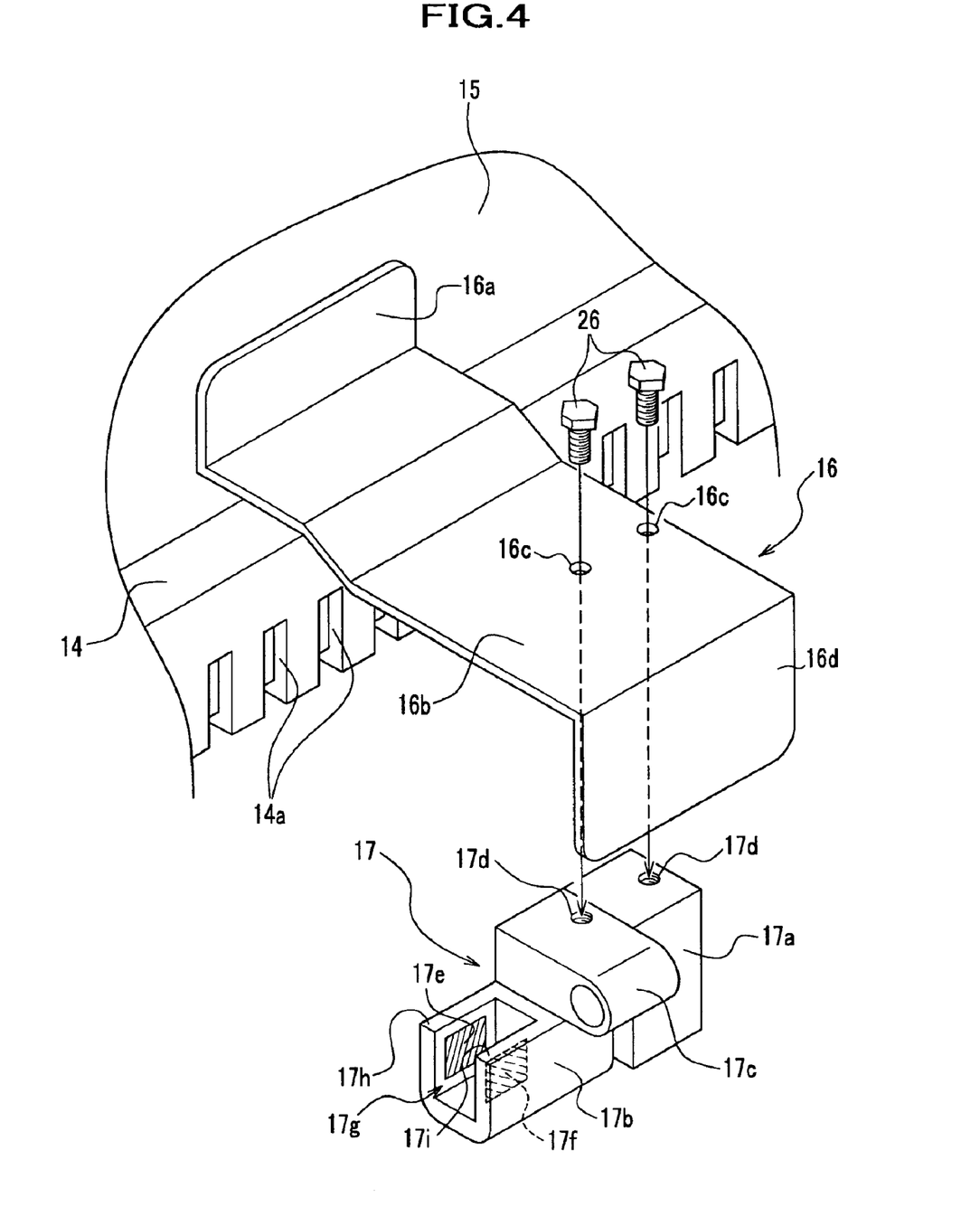
FIG. 4 is a partially exploded perspective view showing the region around the position sensor.

As shown in FIG. 4, the position sensor 17 is disposed at an inner wall of the movable member 15 through the sensor mounting bracket 16. In other words, the sensor mounting bracket 16 is disposed at the movable member 15 so that the position sensor 17 is positioned between a pair of the movable members 15 and 15, which are provided at the bottom of the seat 11, and is positioned in the vicinity of the stationary member 14.

This position sensor 17 has a sensor body 17a, a detection part 17b extending from the sensor body 17a, and a cable connection part 17c being provided on the sensor body 17a.

The sensor body 17a has a screw-hole 17d which is used when the position sensor 17 is fixed to the sensor mounting bracket 16. A magnet 17e and a magnet sensor 17f are provided on the detection part so that the magnet 17e and the magnet sensor 17f face with each other.

To be more precise, a groove 17g is formed on the detection part 17b so that the groove 17g is formed along the longitudinal direction with respect to the stationary member 14. In this detection part 17b, as can be seen in FIG. 4, two parallel walls 17h and 17i are located along the groove 17g. Thus, the magnet 17e and the magnet sensor 17f are provided on each of the walls 17h and 17i, separately.

The position sensor 17 detects the presence of the conjugated bracket 18 (a magnetic interception bracket 18b), when the detection part 17b is slid in response to sliding of the seat 11 and the conjugated bracket 18 (the magnetic interception bracket 18b) is positioned at the region between the magnet 17e and the magnet sensor 17f. In this occasion, a detection signal representing the presence of the conjugated bracket 18 (the magnetic interception bracket 18b) is supplied from the sensor body 17a through a cable 25 (FIG. 1), which is connected to the cable connection part 17c.

The sensor mounting bracket 16 is formed from a plate member covered with a resin material. This sensor mounting bracket 16 is connected to the movable member 15 through a base 16a, which is formed by bending one end of the plate member vertically with respect to a principal part 16b and is integrated with the movable member 15. The other end of the plate member is bent vertically with respect to the principal part 16b and serves as a protector 16d. Here, the extending direction of the base 16a and the extending direction of the protector 16d becomes upside down with each other.

A pair of through holes 16c and 16c is bored on the principal part 16b of the sensor mounting bracket 16. Thereby, by screwing a screw 26 to each through-hole 16c and each screw-hole 17d, respectively, the position sensor 17 is fixed to the sensor mounting bracket 16. As can be seen from FIG. 4, the upper surface and the side surface of the position sensor 17 are protected by the sensor mounting bracket 16 and the stationary member 14.

Figure 5:
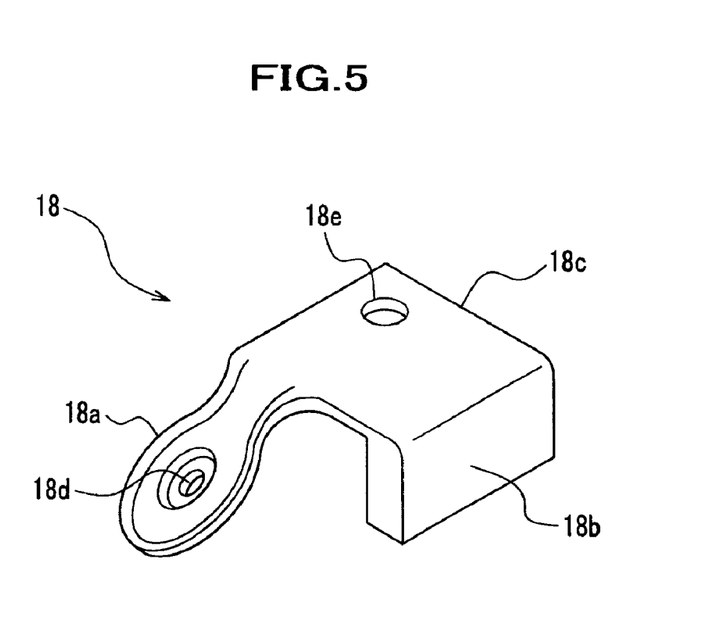
FIG. 5 is a perspective view showing a conjugated bracket.

As shown in FIG. 5, the conjugated bracket 18 is composed of a stationary bracket 18a, a magnetic interception bracket 18b, and a connection part 18c. In this conjugated bracket 18, the stationary bracket 18a, and the magnetic interception bracket 18b are provided as a single piece.

The magnetic interception bracket 18b extends in the vertical direction from the connection part 18c so that the magnetic interception bracket 18b is positioned at the region between the magnet 17e and the magnet sensor 17f, when the seat 11 is positioned at the prescribed position. The stationary bracket 18a extends in the obliquely downward direction so that the stationary bracket 18a is positioned at the suitable position and direction with respect to the base member 12.

In the present embodiment, the conjugated bracket 18 is made of a ferromagnetic material, such as iron, which cuts off the magnetic line directed to the magnet sensor 17f from the magnet 17e. In other words, a ferromagnetic material, which can prevent the penetration of the magnetic line, is adopted as the conjugated bracket 18.

In the present embodiment, additionally, the surface of the conjugated bracket 18 is covered with a resin material.

The stationary bracket 18a has a bolt-hole 18d. Thus, the conjugated bracket 18 is attached to the base member 12 by the bolt 20 using this bolt-hole 18d. The connection part 18c has a rivet-hole 18e. Thus, the conjugated bracket 18 is attached to the stationary member 14 by the rivet 21 using this rivet-hole 18e.

Next, the motion of the seat position detection unit 10 will be explained. When the user pulls up the lever 13a and releases the fixation of the movable member 15 to the stationary member 14, the seat 11 is allowed to slide in the fore-and-rear directions.

Figure 6:
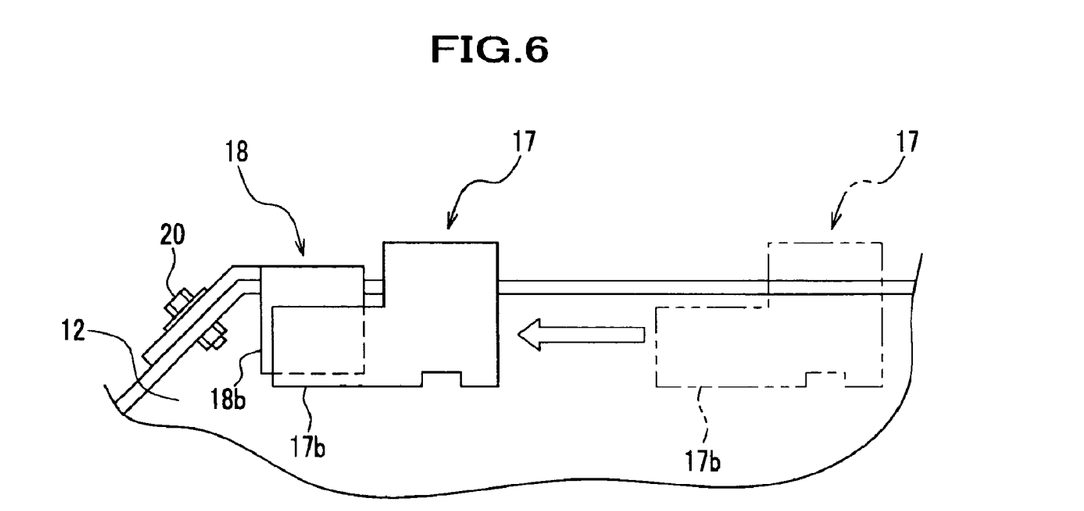
FIG. 6 is a schematic view showing the positional relation between the position sensor and the conjugated bracket when the position of the vehicle seat is changed.

For example, when the user slides the seat 11 in the fore direction, as shown in FIG. 6, the position sensor 17 attached to the movable member 15 is displaced toward the conjugated bracket 18. Then, the position of the seat 11 is fixed when the user releases the lever 13a after sliding the seat 11 to the fore-side end.

In this occasion, since the magnetic interception bracket 18b is positioned between the magnet 17e and the magnet sensor 17f, the magnetic line directed to the magnet sensor 17f from the magnet 17e is cut off.

Thereby, the position sensor 17 detects the presence of the conjugated bracket 18 by detecting that the magnetism is not detected by the magnet sensor 17f. That is, it is judged that the seat 11 is positioned at the prescribed position.

In the seat position detection unit 10, the conjugated bracket 18 has functions of: a fixing function, which fixes the stationary member 14 to the base member 12; and a detecting function, which detects the position of the seat 11 by the position sensor 17. Additionally, the conjugated bracket 18 united into the integral body from the stationary bracket 18a, the magnetic interception bracket 18b, and the connection part 18c is used.

Therefore, the accuracy of the location between the magnetic interception bracket 18b and the stationary member 14 is achieved, if the stationary member 14 is fixed to the base member 12 through the conjugated bracket 18 after performing the accurate positioning between the base member 12 and the stationary member 14.

Thereby, the positioning step, in which the accurate positioning of the detecting object is performed, can be omitted, when assembling the seat position detection unit, including a stationary bracket (member) and a detecting object. Thus, the workability of the assembling of the seat position detection unit will be improved. Additionally, the seat position detection unit 10 can detect that the seat 11 is positioned at the prescribed position with accuracy.

In the present invention, the attaching operation of the stationary bracket 18a to the base member 12 is performed from the fore-side with respect to the seat 11. Thus, since the wide working space is secured, the conjugated bracket 18 is easily attached to the base member 12.

Addtionally, if the conjugated bracket 18 is attached from the fore-side with respect to the seat 11, since the operation is easily performed, the conjugated bracket 18 can be positioned in a proper position with high accuracy. Thereby, the magnetic interception bracket 18b will be easily positioned in the proper position with more improved accuracy.

In the present invention, whether the seat 11 is positioned at the prescribed position is detectable. In this occasion, since the signal representing that the seat 11 is positioned at the prescribed position is supplied from the position sensor 17, this signal can be utilized in an airbag apparatus.

For example, if the deployment of the airbag is controlled based on this signal, the rate and force of the deployment of the airbag can be decreased when the seat 11 is positioned at the forefront.

Thereby, the impactive force to be added to an occupant sitting on the seat 11 at the time of the inflation of the airbag can be decreased. That is, the inflation control of the airbag can be performed depending on the position of the seat 11.

In the seat position detection unit 10, the movable member 15 and the sensor mounting bracket 16 are united together and served as a united member. Thus, the accurate positioning of the position sensor 17 can be achieved. Thereby, the seat position detection unit 10 can measure the position of the seat 11 more accurately.

In the present invention, since the position sensor 17 is protected by the sensor mounting bracket 16, the damage of the position sensor 17 caused by the external influence, such as a collision with other objects, can be prevented.

In the seat position detection unit 10, the surface of each of the sensor mounting bracket 16 and the conjugated bracket 18 are covered with the resin material, respectively. Thus, the sharp edges (burr) of these brackets 16 and 18 are coated with the resin material. Thereby, the incidence of the injury by the area with a potential puncture hazard is decreased, and the safety is improved.

Although there have been disclosed what is the present embodiment of the invention, it will be understood by persons skilled in the art that variations and modifications may be made thereto without departing from the scope of the invention, which is indicated by the appended claims.

In the present invention, any type of sensor can be adoptable as the position sensor 17, as long as it can detect the position of the seat 11. For example, a detector adopting a light sensor or an ultrasonic sensor may be applicable instead of the detection part 17b adopting a magnet sensor.

What is claimed is:

1. A seat position detection unit equipped with a slide mechanism that allows a seat to slide with respect to a floor, the seat position detection unit comprising:

a position sensor attached to one of a stationary member and a movable member that constitute the slide mechanism;

a detecting object, which is detected by the position sensor, and which is disposed at the other of the stationary member and the movable member; and a mounting member adapted to mount the stationary member to the floor, wherein one of the position sensor and the detecting object that is attached to the stationary member is fixed directly to the mounting member.

2. A seat position detection unit according to claim 1, wherein the position sensor is attached to one of the stationary member and the movable member through a connection member, wherein the connection member has a protector which protects the position sensor.

3. A seat position detection unit equipped with a slide mechanism that allows a seat to slide with respect to a floor, the seat position detection unit comprising:
   a position sensor attached to one of a stationary member and a movable member that constitute the slide mechanism;
   a detecting object, which is detected by the position sensor, and which is disposed at the other of the stationary member and the movable member; and
   a mounting member, adapted to mount the stationary member to the floor, wherein
   one of the position sensor and the detecting object that is attached to the stationary member is united with the mounting member, and wherein
   the position sensor is attached to the movable member through a connection member, which has a protector that protects the position sensor, and wherein
   the detecting object is connected to the stationary member through the mounting member, and wherein
   the surface of the connection member, the mounting member, and the detecting object are covered with a resin.

4. A seat position detection unit comprising:
   a movable member, which is attached to a bottom of a seat so that the movable member is located along the fore-and-rear directions with respect to the seat;
   a stationary member, which is put together with the movable member and allows the seat to slide along the stationary member;
   a mounting member adapted to mount the stationary member to a floor;
   a position sensor, which is attached to the movable member; and
   a detecting object, which is detected by the position sensor, and is disposed at the stationary member,
   wherein the detecting object and the mounting member are integrally formed to provide a single piece, and wherein
   the position sensor detects the detecting object by measuring an interruption of a magnetic field caused by the detecting object.

5. A seat position detection unit according to claim 4, wherein the single piece is attached to the stationary member with a single fastener.

6. A seat position detection unit according to claim 4, wherein the position sensor includes a magnet and a magnet sensor, and the magnet is mounted so as to confront the magnet sensor in a parallel, spaced apart relationship, and wherein
   a magnetic field between the magnet and the magnet sensor is interrupted by the detecting object when the detecting object is received in the space between the magnet and the magnet sensor.

7. A seat position detection unit according to claim 6, wherein:
   the mounting member includes a mounting surface for securing the mounting member to the stationary member and a first flange extending at an oblique angle from the mounting member for securing the mounting member to the floor; and
   the detecting object is a second flange extending normally from the mounting member and operatively cooperates with the position sensor to indicate seat position.

8. A seat position detection unit according to claim 4, wherein:
   the mounting member includes a mounting surface for securing the mounting member to the stationary member and a first flange extending at an oblique angle from the mounting member for securing the mounting member to the floor; and
   the detecting object is a second flange extending normally from the mounting member and operatively cooperates with the position sensor to indicate seat position.

9. A seat position detection unit according to claim 4, wherein
   the position sensor is attached to the movable member through a connection member, and wherein
   the connection member has a protector, which protects the position sensor.

10. A seat position detection unit according to claim 9, wherein
    the stationary member is provided along a fore-and-rear directions of the seat, and wherein the seat position detection unit includes two of the mounting members,
       a first mounting member that mounts the stationary member to the floor at a fore-side end of the stationary member, and
       a second mounting member that mounts the stationary member to the floor at the rear-side end of the stationary member, and wherein
    the first mounting member and the detecting object are integrally formed to provide the single piece.

11. A seat position detection unit comprising:
    a movable member, which is attached to a bottom of a seat so that the movable member is located along the fore-and-rear directions with respect to the seat;
    a stationary member, which is put together with the movable member and allows the seat to slide along the stationary member;
    a mounting member adapted to mount the stationary member to a floor;
    a position sensor, which is attached to the movable member; and
    a detecting object, which is detected by the position sensor, and is disposed at the stationary member,
    wherein the detecting object and the mounting member are provided as a single piece, and wherein
    the position sensor is attached to the movable member through a connection member, and wherein
    the connection member has a protector, which protects the position sensor, and wherein
    the stationary member is provided along a fore-and-rear directions of the seat, and wherein the seat position detection unit includes two of the mounting members,
       a first mounting member that mounts the stationary member to the floor at a fore-side end of the stationary member, and
       a second mounting member that mounts the stationary member to the floor at the rear-side end of the stationary member, and wherein
    the first mounting member and the detecting object are integrally formed to provide the single piece, and wherein
    the surface of the mounting member and the connection member are covered with a resin.

12. A seat position detection unit according to claim 1, wherein the mounting member fixed with one of the position sensor and the detecting object is provided as a single piece, and is attached to the stationary member with a single fastener.

13. A seat position detection unit according to claim 1, wherein the mounting member fixed to one of the position sensor and the detecting object is integrally formed to provide a single piece.

14. A seat position detection unit according to claim 1, wherein the position sensor includes a magnet and a magnet sensor, and the magnet is mounted so as to confront the magnet sensor in a parallel, spaced apart relationship, and wherein     a magnetic field between the magnet and the magnet sensor is interrupted by the detecting object when the detecting object is received in the space between the magnet and the magnet sensor.

15. A seat position detection unit according to claim 14, wherein:

the mounting member includes a mounting surface for securing the mounting member to the stationary member and a first flange extending at an oblique angle from the mounting member for securing the mounting member to the floor; and     the detecting object is a second flange extending normally from the mounting member and operatively cooperates with the position sensor to indicate seat position.

16. A seat position detection unit according to claim 1, wherein:

the mounting member includes a mounting surface for securing the mounting member to the stationary member and a first flange extending at an oblique angle from the mounting member for securing the mounting member to the floor; and     the detecting object is a second flange extending normally from the mounting member and operatively cooperates with the position sensor to indicate seat position.

* * * * *